(12) United States Patent
Tanaka et al.

(10) Patent No.: US 6,545,248 B2
(45) Date of Patent: Apr. 8, 2003

(54) LASER IRRADIATING APPARATUS

(75) Inventors: Koichiro Tanaka, Kanagawa (JP); Norihito Kawaguchi, Tokyo (JP); Kenichiro Nishida, Saitama (JP)

(73) Assignees: Semiconductor Energy Laboratory Co., Ltd. (JP); Ishikawajima-Harima Heavy Industries Co., Ltd. (JP)

( * ) Notice: Subject to any disclaimer, the term of this patent is extended or adjusted under 35 U.S.C. 154(b) by 0 days.

(21) Appl. No.: 10/096,858

(22) Filed: Mar. 14, 2002

(65) Prior Publication Data

US 2002/0134765 A1 Sep. 26, 2002

(30) Foreign Application Priority Data

Mar. 16, 2001 (JP) ........................................ 2001-076108

(51) Int. Cl.[7] ............................................... B23K 26/00
(52) U.S. Cl. ............................................... 219/121.65
(58) Field of Search .................. 219/121.6, 121.65, 219/121.66, 121.67, 121.68, 121.73, 121.74, 121.75

(56) References Cited

U.S. PATENT DOCUMENTS 5,970,368 A * 10/1999 Sasaki et al.
6,291,796 B1 * 9/2001 Lu et al.
6,366,308 B1 * 4/2002 Hawryluk et al.

FOREIGN PATENT DOCUMENTS

JP 2000-150412 5/2000

* cited by examiner

*Primary Examiner*—Samuel M. Heinrich
(74) *Attorney, Agent, or Firm*—Nixon Peabody LLP; Jeffrey L. Costellia

(57) ABSTRACT

Disclosed is a laser irradiating apparatus which forms a laser beam having an improved and uniform energy distribution on or near its irradiation surface in case where a laser oscillator having a high coherence is used. The laser irradiating apparatus forms a laser beam having a cyclic energy distribution by intentionally forming interference fringes on or near the irradiation surface by utilizing a high coherence, so that the energy distribution of the laser beam is cyclically repeated. From a macro viewpoint, such a laser beam can be considered as having a uniform energy distribution.

5 Claims, 4 Drawing Sheets

LASER IRRADIATING APPARATUS

BACKGROUND OF THE INVENTION

1. Field of the Invention

The present invention relates to a laser irradiating apparatus which performs annealing using a laser beam (hereinafter called "laser annealing") and which includes a laser and an optical system for guiding a laser beam emitted from the laser to an object to be processed.

2. Description of the Related Art

A glass substrate is advantageous over a synthetic quartz glass substrate, which has been popular conventionally, in inexpensiveness and high processability. It is possible to easily produce a large substrate of, for example, 600 mm×720 mm from a glass substrate. This is one reason why studies on a glass substrate are being made. The reason for the use of a laser in annealing is that annealing can be carried out without significantly raising the temperature of the substrate so that a glass substrate with a low melting point can be used. In addition, laser annealing has a considerably high throughput as compared with heating means using an electric heating furnace.

A method which executes laser annealing by using an optical system to process a pulsed laser beam from a high-power laser, such as an excimer laser, into a rectangular spot of several centimeters on each side or a linear shape of 10 cm or longer in length on an irradiation surface and scanning a target with the laser beam (or moving the irradiation position of the laser beam in relative to the irradiation surface) is used on purpose because of its high productivity and industrial advantage. The "linear shape" mentioned here does not mean a "line" in a strict sense, but means a rectangle having a large aspect ratio (or an elongated ellipse). For example, the "linear shape" indicates an elongated shape of an aspect ratio of over 10 (preferably 100 to 10,000) and a beam with such a shape is called a "linear beam".

When a linear beam is used, particularly, unlike in the case of using a laser beam spot that needs scanning in the forward, backward, right and left directions, the entire irradiation surface can be irradiated with the beam in scanning only in a direction perpendicular to the major axis of the linear beam. This leads to a high productivity. Scanning is carried out in the direction perpendicular to the major axis because it is the most efficient scanning direction. Because of the high productivity, the use of a linear beam acquired by processing a pulse-oscillated excimer laser beam by an adequate optical system in laser annealing is becoming a mainstream in the manufacturing technology at present.

For example, laser annealing can be executed by using a YAG laser. The YAG laser uses a non-linear optical element to modulate a laser beam into the second harmonic and further uses an optical system to process the second harmonic into a linear beam. The energy distribution of the linear beam is made to be a Gaussian distribution in the direction of the minor axis and be uniform in the direction of the major axis (see FIG. 2). But, the YAG laser produces a coherent beam which has an extremely high coherence. The coherent length of the YAG laser is about 10 mm whereas the coherent length of the excimer laser is several micrometers to several tens of micrometers. It is therefore difficult to form a YAG laser beam having a uniform energy distribution on or near the irradiation surface.

SUMMARY OF THE INVENTION

Accordingly, the invention aims at providing a laser irradiating apparatus which forms a laser beam having an improved and uniform energy distribution on or near its irradiation surface.

Laser beams have such a characteristic that the beams, even if emitted from the same light source, do not interfere with one another as long as there is an optical path difference equal to or greater than the coherent length. A YAG laser has a very high coherence as compared with an excimer laser. The coherent length of the YAG laser is around 10 mm whereas the coherent length of the excimer laser is several micrometers to several tens of micrometers.

The invention is characterized in that a laser beam having a cyclic energy distribution is formed by intentionally forming interference fringes on or near the irradiation surface by utilizing the high coherence of a YAG laser, thereby ensuring cyclic repetition of the energy distribution of the laser beam. From a macro viewpoint, such a laser beam can be considered as having a uniform energy distribution.

DETAILED DESCRIPTION OF THE PREFERRED EMBODIMENTS

Figure 1:
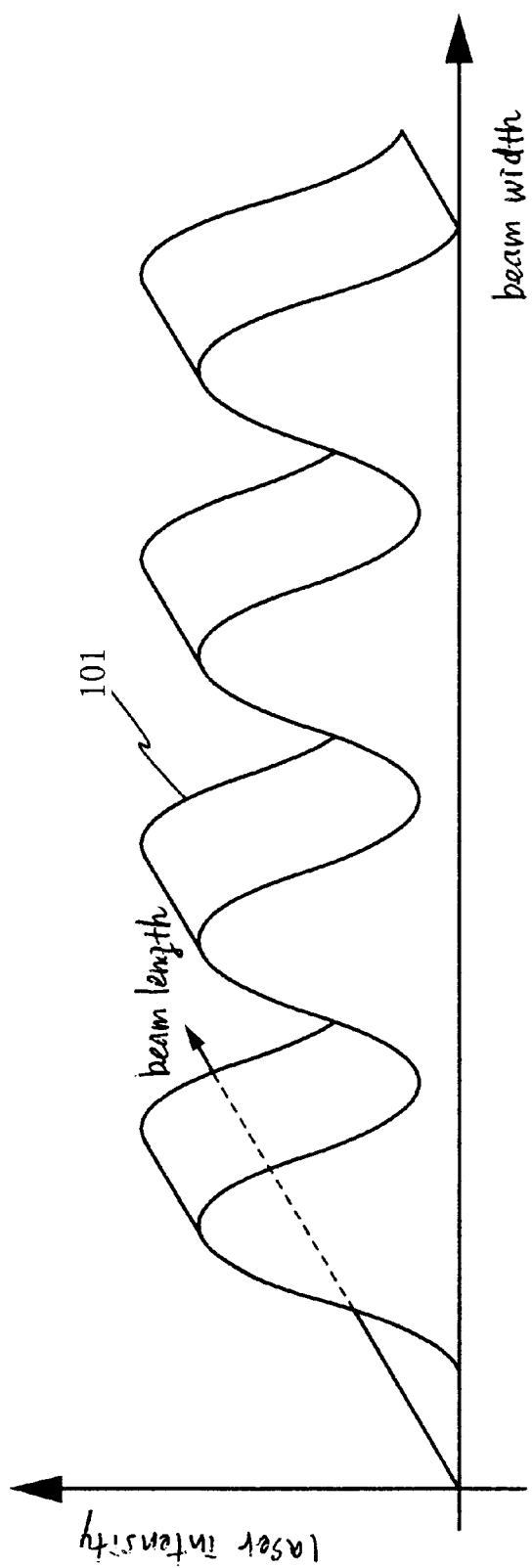
FIG. 1 is a diagram illustrating the concept of the invention.
Figure 2:
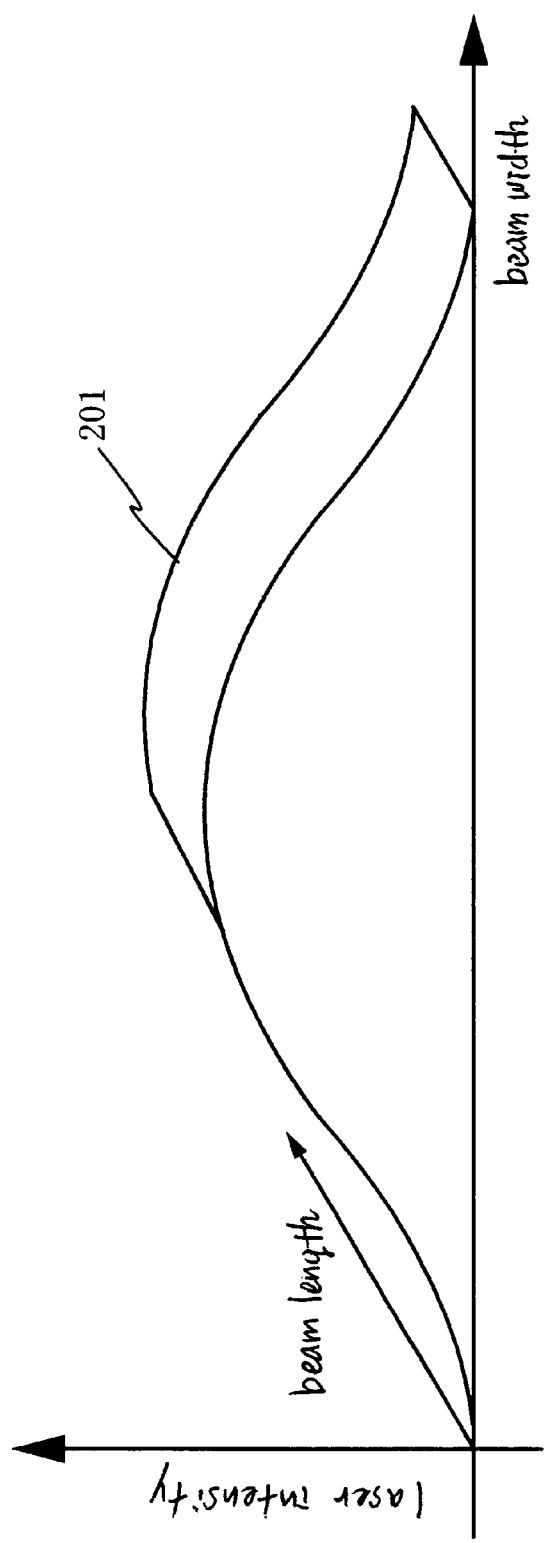
FIG. 2 is a diagram illustrating the concept of a laser beam according to the related art.

The invention will now be described with reference to FIG. 1. A laser beam 101 has a cyclic energy distribution due to the coherent effect. Such a distribution is acquired by, for example, splitting a laser beam emitted from a same light source into sub laser beams by means of slits, a half mirror or the like and synthesizing the sub laser beams on or near the irradiation surface. To keep the coherence of the laser beam, the optical path difference of plural laser beams is made shorter than the coherent length of the laser beams.

It is desirable to process the laser beam into a linear shape by using an optical system before irradiation. Processing a laser beam in a linear shape means processing of a laser beam in such a way that its shape on or near the irradiation surface becomes linear. That is, the cross-sectional shape of a laser beam is processed into a linear shape.

A laser oscillator which is used in the invention may be of any ordinary type known. For example, a YAG laser (which normally indicates an Nd:YAG laser), a YLF laser, a $YVO_4$ laser, and a $YAlO_3$ laser, a ruby laser, a Ti:sapphire laser or a glass laser can be used. It is particularly preferable to use a YAG laser which is superior in coherence and pulse energy.

It is to be noted however that because fundamental wave (first harmonic) of a YAG laser has a long wavelength of 1064 nm, the second harmonic (wavelength of 532 nm) is used. The generation of the second harmonic can be accomplished by any well-known scheme.

A Q-switching scheme (Q-modulation switching system) which is often used for a YAG laser may be used as well. This scheme produces a sharp pulsed laser beam having an extremely high energy value by rapidly increasing the Q value from the state where the Q value of a laser resonator is set sufficiently low. The use of the Q-switching scheme, which is a known technique, can ensure harmonic pulse oscillation.

Figure 3:
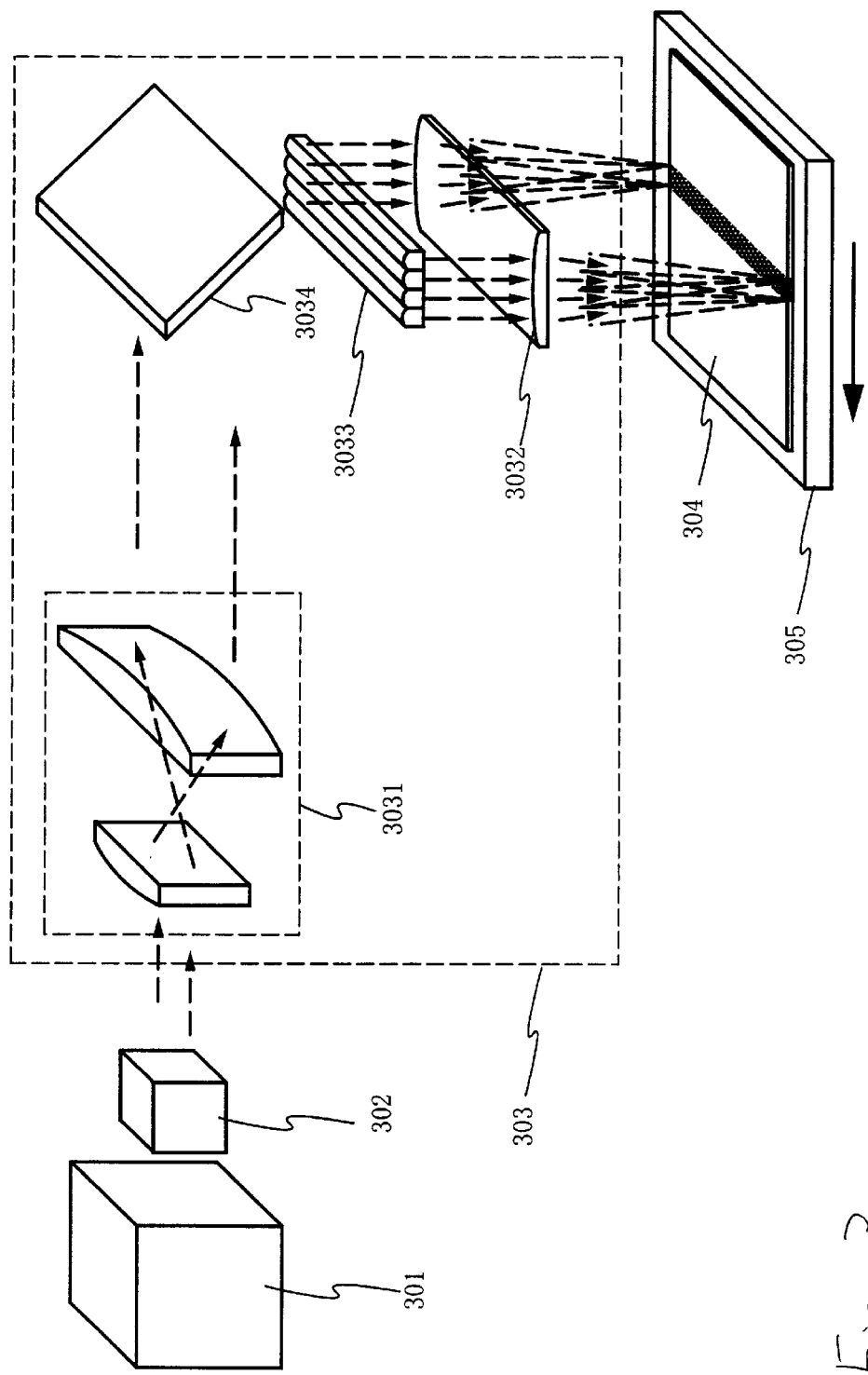
FIG. 3 is a diagram showing an example of the structure of a laser irradiating apparatus according to the invention.

FIG. 3 is a diagram showing an example of the structure of a laser irradiating apparatus according to the invention. This laser irradiating apparatus includes a laser oscillator 301, a non-linear optical element 302, an optical system 303 which processes a laser beam into a linear beam, and an irradiation surface 304. The optical system 303 which forms a linear laser beam on the irradiation surface 304 uses a beam expander 3031 and a cylindrical lens 3032. The beam expander 3031 is a combination of, for example, cylindrical lenses of a long focal length for elongating a laser beam. The cylindrical lens 3032 has a long focal length for condensing a laser beam in a thin form. The reason for the use of cylindrical lenses of a long focal length is to suppress astigmation as much as possible and acquire a beam with a uniform energy distribution on the irradiation surface 304. A cylindrical arrayed lens 3033 is arranged in front of the cylindrical lens 3032 to split a laser beam into a plurality of sub laser beams. The split laser beams are synthesized on or near the irradiation surface 304 by the cylindrical lens 3032, so that the energy distribution can be repeated cyclically. A reflecting mirror 3034 is provided above the cylindrical arrayed lens 3033 to be able to change the traveling direction of the laser beam. Provided on the irradiation surface 304 is a stage which moves in a direction perpendicular to the direction of the major axis of a linear beam formed by the optical system 303.

The use of the laser irradiating apparatus can form a laser beam having a cyclic energy distribution on or near the irradiation surface due to the interference. From a macro viewpoint, such a laser beam can be considered as having a uniform energy distribution.

Preferred embodiments of the invention with the above-described structure will be described more specifically.

(First Embodiment)

A first embodiment of the invention will be discussed below.

FIG. 3 is a diagram exemplifying the structure of a laser irradiating apparatus according to the first embodiment of the invention. The laser irradiating apparatus includes a laser oscillator 301, a non-linear optical element 302, an optical system 303 which processes a laser beam into a linear beam, and an irradiation surface 304. The optical system 303 which forms a linear laser beam on the irradiation surface 304 uses a beam expander 3031 and a cylindrical lens 3032. The beam expander 3031 is a combination of, for example, cylindrical lenses of a long focal length for elongating a laser beam. The cylindrical lens 3032 has a long focal length for condensing a laser beam in a thin form. A cylindrical arrayed lens 3033 is arranged in front of the cylindrical lens 3032 to split a laser beam into a plurality of sub laser beams. The split laser beams are synthesized on or near the irradiation surface 304 by the cylindrical lens 3032, so that the energy distribution of the laser beam can be repeated cyclically. A reflecting mirror 3034 is provided above the cylindrical arrayed lens 3033 to ensure alteration of the traveling direction of the laser beam. Provided on the irradiation surface 304 is a stage which moves in a direction perpendicular to the direction of the major axis of a linear beam formed by the optical system 303.

In the embodiment, a flash-lamp exciting type YAG laser having a frequency of 30 Hz is used as the laser oscillator 301. The laser beam that is emitted from the YAG laser is modulated by the non-linear optical element 302 to be a second harmonic having an energy density of 800 mJ/pulse. The focal distance of the cylindrical lens 3032 is 200 mm. The cylindrical arrayed lens 3033 uses eight cylindrical lenses with a focal distance of 200 mm arranged in an array. The cylindrical lenses have a width of 2 mm and a length of 60 mm. The irradiation surface 304 is located at the focal point of the cylindrical lens 3032 or at a distance of 400 mm behind the cylindrical lens 3032. The provision of such an optical system can form a linear beam having about 50 interference fringes on the irradiation surface 304.

The structure can form a laser beam having an interference-originated cyclic energy distribution on or near the irradiation surface. The cyclic energy distribution may be formed in either the direction of the minor axis or the direction of the major axis. From a macro viewpoint, such a laser beam can be considered as having a uniform energy distribution.

(Second Embodiment)

A second embodiment of the invention which is different from the first embodiment will now be discussed.

Figure 4:
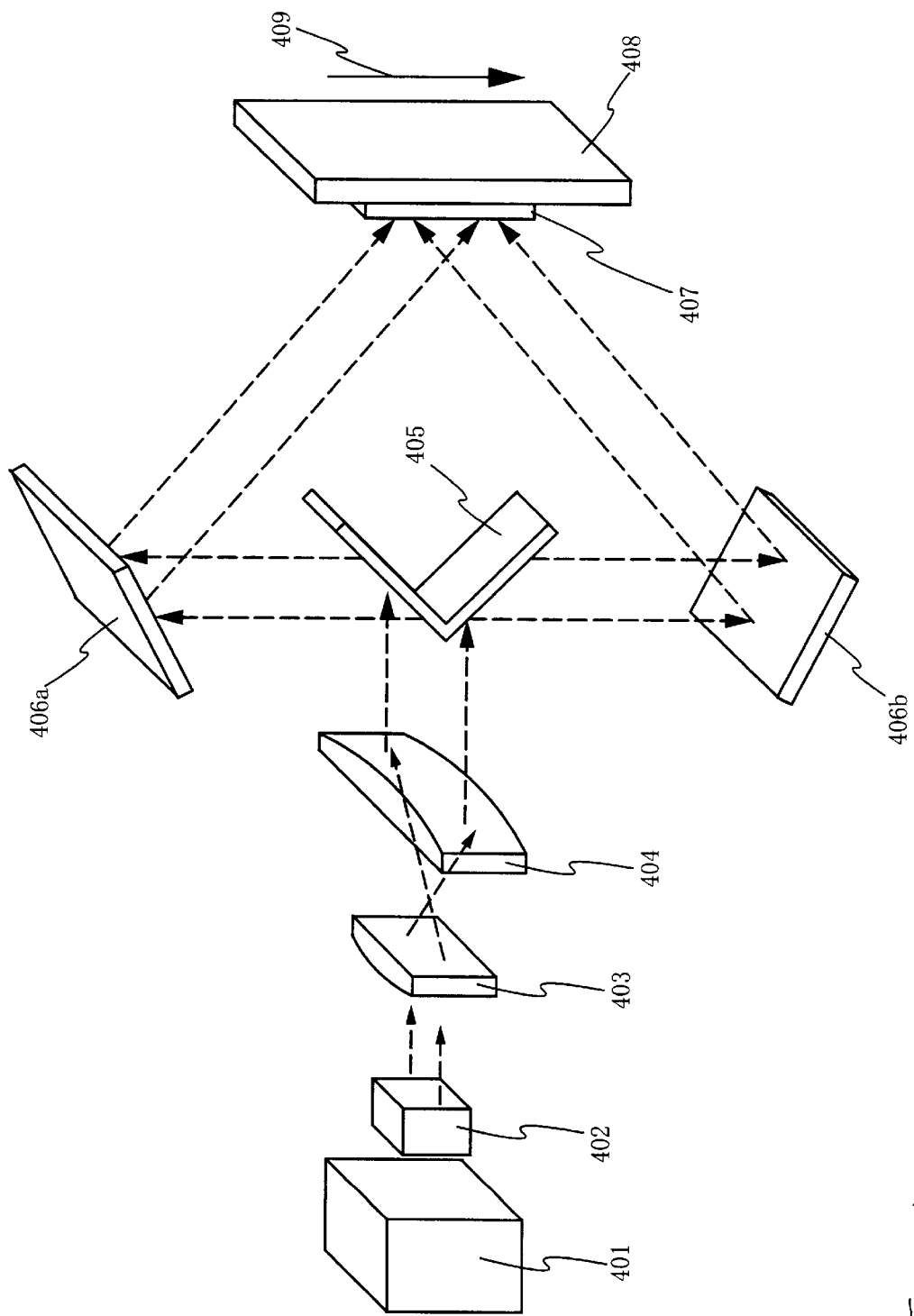
FIG. 4 is a diagram showing another example of the structure of the laser irradiating apparatus according to the invention.

FIG. 4 is a diagram exemplifying the structure of a laser irradiating apparatus according to the second embodiment of the invention. The laser irradiating apparatus includes a laser oscillator 401, a non-linear optical element 402, an optical system 403 to 406 which processes a laser beam into a beam having a cyclic energy distribution on or near an irradiation surface 407, and the irradiation surface 407. The optical system which processes the laser beam into the beam having the cyclic energy distribution on or near the irradiation surface 407 includes a beam expander 403, 404, which is a combination of, for example, cylindrical lenses of a long focal length for elongating a laser beam, a mirror 405 for splitting a laser beam into two directions and mirrors 406a and 406b for synthesizing the split laser beams on or near the irradiation surface 407. The mirrors 405 and 406 synthesize the laser beams on or near the irradiation surface 407, so that the energy distribution can be cyclically repeated. Provided on the irradiation surface 407 is a stage 408 which moves in a direction 409 parallel to the direction along which the cyclic energy distribution of the laser beam processed by the optical system 403 to 406 is formed.

The structure can form a laser beam having an interference-originated cyclic energy distribution on or near the irradiation surface. From a macro viewpoint, such a laser beam can be considered as having a uniform energy distribution.

As apparent from the foregoing description, the invention can form a laser beam having an interference-originated cyclic energy distribution on or near the irradiation surface. From a macro viewpoint, such a laser beam can be considered as having a uniform energy distribution.

Although the foregoing description of the embodiments has been given of the case where a laser beam has a linear shape or a rectangular shape on the irradiation surface, the invention can adapted to laser beams having other shapes as well.

What is claimed is:

1. A laser irradiating apparatus comprising:
    an irradiation surface;
    a pulse oscillation type laser; and
    an optical system for splitting a first laser beam from said pulse oscillation type laser into a plurality of first sub laser beams as a light source on or near said irradiation surface and synthesizing said sub laser beams on or near said irradiation surface to cause interference, thereby forming a second laser beam having a cyclic energy distribution in one direction,
    said irradiation surface being movable in said one direction in relative to said second laser beam.

2. A laser irradiating apparatus comprising:
    an irradiation surface;

a pulse oscillation type laser; and an optical system for splitting a laser beam from said pulse oscillation type laser into a plurality of sub laser beams as a light source on or near said irradiation surface and synthesizing said sub laser beams on or near said irradiation surface to cause interference, thereby forming a linear beam having a cyclic energy distribution in a direction of a minor axis, said irradiation surface being movable in said direction of said minor axis in relative to said linear laser beam.

3. A laser irradiating apparatus comprising:

an irradiation surface;

a pulse oscillation type laser; and an optical system for splitting a laser beam from said pulse oscillation type laser into a plurality of sub laser beams as a light source on or near said irradiation surface and synthesizing said sub laser beams on or near said irradiation surface to cause interference, thereby forming a linear beam having a cyclic energy distribution in a direction of a major axis, said irradiation surface being movable in said direction of said major axis in relative to said linear laser beam.

4. The laser irradiating apparatus according to any one of claims 1 to 3, wherein said optical system has one type or plural types of optical elements selected from a group of a cylindrical arrayed lens, a cylindrical lens, a mirror, a half mirror and a slit.

5. The laser irradiating apparatus according to any one of claims 1 to 3, wherein said pulse oscillation type laser is one selected from a group of a YAG laser, a YLF laser, a $YVO_4$ laser and a $YAlO_3$ laser.

* * * * *